(12) United States Patent
Golsch

(10) Patent No.: US 10,917,784 B2
(45) Date of Patent: Feb. 9, 2021

(54) SYSTEMS AND METHODS OF CLOUD BONDING FOR VEHICLES

(71) Applicants: DENSO International America, Inc., Southfield, MI (US); DENSO CORPORATION, Kariya (JP)

(72) Inventor: Kyle Golsch, Pontiac, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 16/358,895

(22) Filed: Mar. 20, 2019

(65) Prior Publication Data
US 2019/0306703 A1 Oct. 3, 2019

Related U.S. Application Data

(60) Provisional application No. 62/648,786, filed on Mar. 27, 2018.

(51) Int. Cl.
| | |
|---|---|
| *H04W 12/00* | (2009.01) |
| *H04W 76/14* | (2018.01) |
| *H04W 4/40* | (2018.01) |
| *H04W 12/06* | (2009.01) |
| *H04W 4/80* | (2018.01) |
| *H04L 29/08* | (2006.01) |

(52) U.S. Cl.
CPC .......... *H04W 12/003* (2019.01); *H04W 4/40* (2018.02); *H04W 4/80* (2018.02); *H04W 12/00512* (2019.01); *H04W 12/0608* (2019.01); *H04W 76/14* (2018.02); *H04L 67/12* (2013.01)

(58) Field of Classification Search
None
See application file for complete search history.

(56) References Cited

U.S. PATENT DOCUMENTS

| | | |
|---|---|---|
| 8,930,045 B2 | 1/2015 | Oman et al. |
| 9,123,244 B2 | 9/2015 | Daman et al. |
| 9,688,247 B1 | 6/2017 | Jayaraman et al. |

(Continued)

FOREIGN PATENT DOCUMENTS

| | | |
|---|---|---|
| BR | 102014017465 A2 | 2/2016 |
| CN | 104574593 A | 4/2015 |

(Continued)

*Primary Examiner* — Ayaz R Sheikh
*Assistant Examiner* — Tarrell A Hampton
(74) *Attorney, Agent, or Firm* — Harness, Dickey & Pierce, P.L.C.

(57) ABSTRACT

A method for pairing a device with a vehicle of a plurality of shared vehicles. The method includes receiving an advertisement message from the device and, in response to receiving the advertisement message, initiating an attempt to pair with the device. The method further includes determining if the device has previously paired with at least one vehicle of the plurality of shared vehicles. In response to the device having previously paired with the at least one vehicle of the plurality of shared vehicles, the method includes accessing a shared vehicle database and identifying security information corresponding to (i) a device address of the device and (ii) a vehicle ID of the vehicle. The method also includes instructing the vehicle and the device to use the identified security information to pair the device with the vehicle.

17 Claims, 7 Drawing Sheets

(56) References Cited

U.S. PATENT DOCUMENTS

| | | | |
|---|---|---|---|
| 9,794,753 B1 | 10/2017 | Stitt et al. | |
| 9,894,492 B1 | 2/2018 | Elangovan et al. | |
| 10,002,479 B2 | 6/2018 | Oz et al. | |
| 2004/0010338 A1* | 1/2004 | Ogura | G06Q 10/02 700/214 |
| 2004/0014422 A1 | 1/2004 | Kallio | |
| 2005/0099265 A1* | 5/2005 | Dix | G06Q 10/02 340/5.72 |
| 2005/0225643 A1* | 10/2005 | Grignani | H04N 1/21 348/207.99 |
| 2007/0001805 A1* | 1/2007 | Utter | G07C 9/00309 340/5.72 |
| 2009/0015373 A1* | 1/2009 | Kelly | B60R 25/2081 340/5.62 |
| 2009/0271846 A1* | 10/2009 | Desplanques | H04W 12/08 726/4 |
| 2010/0114616 A1* | 5/2010 | Touati | B60R 25/2018 705/5 |
| 2010/0280700 A1* | 11/2010 | Morgal | G06Q 10/02 701/31.4 |
| 2011/0215921 A1 | 9/2011 | Ben Ayed et al. | |
| 2012/0045058 A1 | 2/2012 | Weghaus | |
| 2012/0108208 A1 | 5/2012 | Willis | |
| 2013/0090781 A1* | 4/2013 | Gellatly | B60R 25/25 701/2 |
| 2013/0214732 A1 | 8/2013 | Nowottnick | |
| 2014/0152091 A1 | 6/2014 | Muller et al. | |
| 2014/0156110 A1* | 6/2014 | Ehrman | G08G 1/00 701/2 |
| 2014/0156111 A1* | 6/2014 | Ehrman | G06Q 30/0645 701/2 |
| 2014/0188348 A1 | 7/2014 | Gautama et al. | |
| 2014/0207629 A1* | 7/2014 | Bradley | B60R 25/00 705/28 |
| 2014/0232520 A1* | 8/2014 | Kawamura | G07C 9/00817 340/5.23 |
| 2014/0232521 A1* | 8/2014 | Kawamura | G07C 9/20 340/5.26 |
| 2014/0240091 A1 | 8/2014 | Talty et al. | |
| 2014/0256304 A1* | 9/2014 | Frye | H04W 4/40 455/418 |
| 2014/0266580 A1* | 9/2014 | Lopez | G07C 9/00571 340/5.6 |
| 2014/0274013 A1 | 9/2014 | Santavicca | |
| 2014/0330449 A1 | 11/2014 | Oman et al. | |
| 2015/0148989 A1 | 5/2015 | Cooper et al. | |
| 2015/0161832 A1* | 6/2015 | Esselink | B60R 25/24 340/5.22 |
| 2015/0161834 A1 | 6/2015 | Spahl et al. | |
| 2015/0221150 A1* | 8/2015 | Frykman | B60R 25/24 340/5.21 |
| 2015/0296441 A1* | 10/2015 | Elnajjar | H04W 4/80 370/312 |
| 2015/0310681 A1 | 10/2015 | Avery et al. | |
| 2015/0356797 A1 | 12/2015 | McBride et al. | |
| 2016/0050563 A1 | 2/2016 | Bronk | |
| 2016/0050699 A1* | 2/2016 | Boss | H04W 4/48 455/41.2 |
| 2016/0063786 A1 | 3/2016 | Lewis et al. | |
| 2016/0087485 A1 | 3/2016 | Maeda et al. | |
| 2016/0150407 A1 | 5/2016 | Michaud et al. | |
| 2016/0203661 A1* | 7/2016 | Pudar | G07C 9/00571 340/5.25 |
| 2016/0318481 A1* | 11/2016 | Penilla | G06Q 10/02 |
| 2017/0018128 A1 | 1/2017 | Berezin et al. | |
| 2017/0062938 A1 | 3/2017 | Cheng et al. | |
| 2017/0104589 A1 | 4/2017 | Lambert et al. | |
| 2017/0132533 A1* | 5/2017 | Darnell | H04L 9/3297 |
| 2017/0156062 A1* | 6/2017 | Dieckmann | H04W 12/003 |
| 2017/0236351 A1 | 8/2017 | Menard et al. | |
| 2017/0237849 A1* | 8/2017 | Livingston | H04M 1/72577 455/418 |
| 2017/0303080 A1 | 10/2017 | Stitt et al. | |
| 2017/0303090 A1 | 10/2017 | Stitt et al. | |
| 2017/0309098 A1 | 10/2017 | Watters et al. | |
| 2017/0320215 A1* | 11/2017 | Strandberg | G05D 1/0022 |
| 2017/0330402 A1 | 11/2017 | Menard et al. | |
| 2017/0352210 A1* | 12/2017 | Maiwand | G07C 9/00857 |
| 2017/0352214 A1* | 12/2017 | Maiwand | G07C 9/00857 |
| 2017/0352215 A1* | 12/2017 | Maiwand | G07C 9/00309 |
| 2018/0009416 A1* | 1/2018 | Maiwand | G07C 9/00309 |
| 2018/0029560 A1 | 2/2018 | Mohaupt et al. | |
| 2018/0099643 A1 | 4/2018 | Golsch et al. | |
| 2018/0103414 A1 | 4/2018 | Golsch | |
| 2018/0126952 A1 | 5/2018 | Niemiec | |
| 2018/0154865 A1 | 6/2018 | Bianchi, III et al. | |
| 2018/0269565 A1 | 9/2018 | Guthrie et al. | |
| 2018/0284765 A1* | 10/2018 | Brouwer | A61B 5/1171 |
| 2018/0338237 A1* | 11/2018 | Maheswaranathan | H04W 4/029 |
| 2019/0092280 A1* | 3/2019 | Oesterling | H04L 63/0428 |
| 2019/0205797 A1* | 7/2019 | Sakurada | G07C 9/27 |
| 2020/0114874 A1* | 4/2020 | Tanaka | G06F 21/55 |
| 2020/0133268 A1* | 4/2020 | Walsh | B60W 50/10 |

FOREIGN PATENT DOCUMENTS

| | | |
|---|---|---|
| EP | 2800068 A2 | 11/2014 |
| FR | 3026212 A1 | 3/2016 |
| JP | 2010079469 A * | 4/2010 |
| WO | WO-2010090533 A2 | 8/2010 |
| WO | WO-2015177298 A1 | 11/2015 |
| WO | WO-16156682 A1 | 10/2016 |
| WO | WO-2017/181035 A1 | 10/2017 |
| WO | WO-2017/181050 A1 | 10/2017 |
| WO | WO-18040641 A1 | 3/2018 |

* cited by examiner

SYSTEMS AND METHODS OF CLOUD BONDING FOR VEHICLES

CROSS-REFERENCE TO RELATED APPLICATION

This application claims the benefit of U.S. Provisional Application No. 62/648,786, filed on Mar. 27, 2018. The entire disclosure of the above application is incorporated herein by reference.

FIELD

The present disclosure relates to automatic pairing of a device and a vehicle, and, more specifically, automatically pairing a device with a vehicle that is included in a shared vehicle database via a wireless connection, such as a Bluetooth connection.

BACKGROUND

Traditionally, a Bluetooth enabled device, such as a smartphone is capable of pairing with another Bluetooth enabled device, such as a vehicle with Bluetooth capabilities. For example, to pair the smartphone with the vehicle, a user is prompted to input a PIN that is displayed on the vehicle and generated by the vehicle into the smartphone. Once the user enters the PIN code on the smartphone, the smartphone generates a link key based on the PIN code. The smartphone then transmits its unique device address assigned to the smartphone to the vehicle, and the vehicle transmits a random challenge to the smartphone. The vehicle also generates a link key based on the transmitted values. The vehicle and the smartphone use the generated link key, the challenge, and the device address to authenticated and pair the devices. That is, the link keys generated by the smartphone and the vehicle should match if the same values of the PIN code, the device address, and the challenge are used to generate the link keys. The smartphone and the vehicle are paired if the link keys match.

Each time the smartphone encounters a new Bluetooth enabled device, the user must manually pair the two devices to create a trusted connection. Once the trusted connection is created, the smartphone will automatically pair with the trusted device in the future when the smartphone is within a predetermined range of the trusted device.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method for pairing a device with a vehicle of a plurality of shared vehicles. The method includes receiving an advertisement message from the device and, in response to receiving the advertisement message, initiating an attempt to pair with the device. The method further includes determining if the device has previously paired with at least one vehicle of the plurality of shared vehicles. In response to the device having previously paired with the at least one vehicle of the plurality of shared vehicles, the method includes accessing a shared vehicle database and identifying security information corresponding to (i) a device address of the device and (ii) a vehicle ID of the vehicle. The method also includes instructing the vehicle and the device to use the identified security information to pair the device with the vehicle.

A vehicle control system of a vehicle for pairing a device with the vehicle of a plurality of shared vehicles. The system includes a device communication module configured to receive an advertisement message from the device, and, in response to receiving the advertisement message, a vehicle control module initiates an attempt to pair the vehicle with the device. The system includes an override module configured to determine if the device has previously paired with at least one vehicle of the plurality of shared vehicles. In response to the device having previously paired with the at least one vehicle of the plurality of shared vehicles, the system includes accessing, via a vehicle network communication module, a shared vehicle database, wherein the shared vehicle database includes security information for each vehicle of the plurality of shared vehicles and identifying, via an authentication module, security information corresponding to (i) a device address of the device and (ii) a vehicle ID of the vehicle. The system also includes instructing, via the override module and the authentication module, the vehicle and the device to use the identified security information to pair the device with the vehicle.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Example embodiments will now be described more fully with reference to the accompanying drawings.

The present disclosure is related to mimicking a trusted connection between two paired devices across shared vehicles. Specifically, shared vehicles are a group of vehicles to which a device has been granted access. Once the device has been paired, via a Bluetooth connection for example, with one of the vehicles included in the group of shared vehicles, the device will automatically pair with the vehicle and any vehicle included in the group of shared vehicles as long as the device is within a predetermined range of the vehicle. Once paired, the Bluetooth connection provides a method of operating a passive entry/passive start system (PEPS) as well as provides the traditional benefits of a Bluetooth connection. For example, a user may find a Bluetooth connection desirable in a vehicle to operate hands free calling through the vehicle, access contacts on their device through the vehicle, and stream audio files from the device on the vehicle's sound system. While the present disclosure describes establishing a Bluetooth connection between a portable device, such as a smartphone, and a vehicle, other wireless connections and protocols may be used. For example, a wireless connection be established using Wi-Fi or Wi-Fi direct, ultra-wide band (UWB), and/or impulse-radio (IR) UWB communication.

Figure 1:
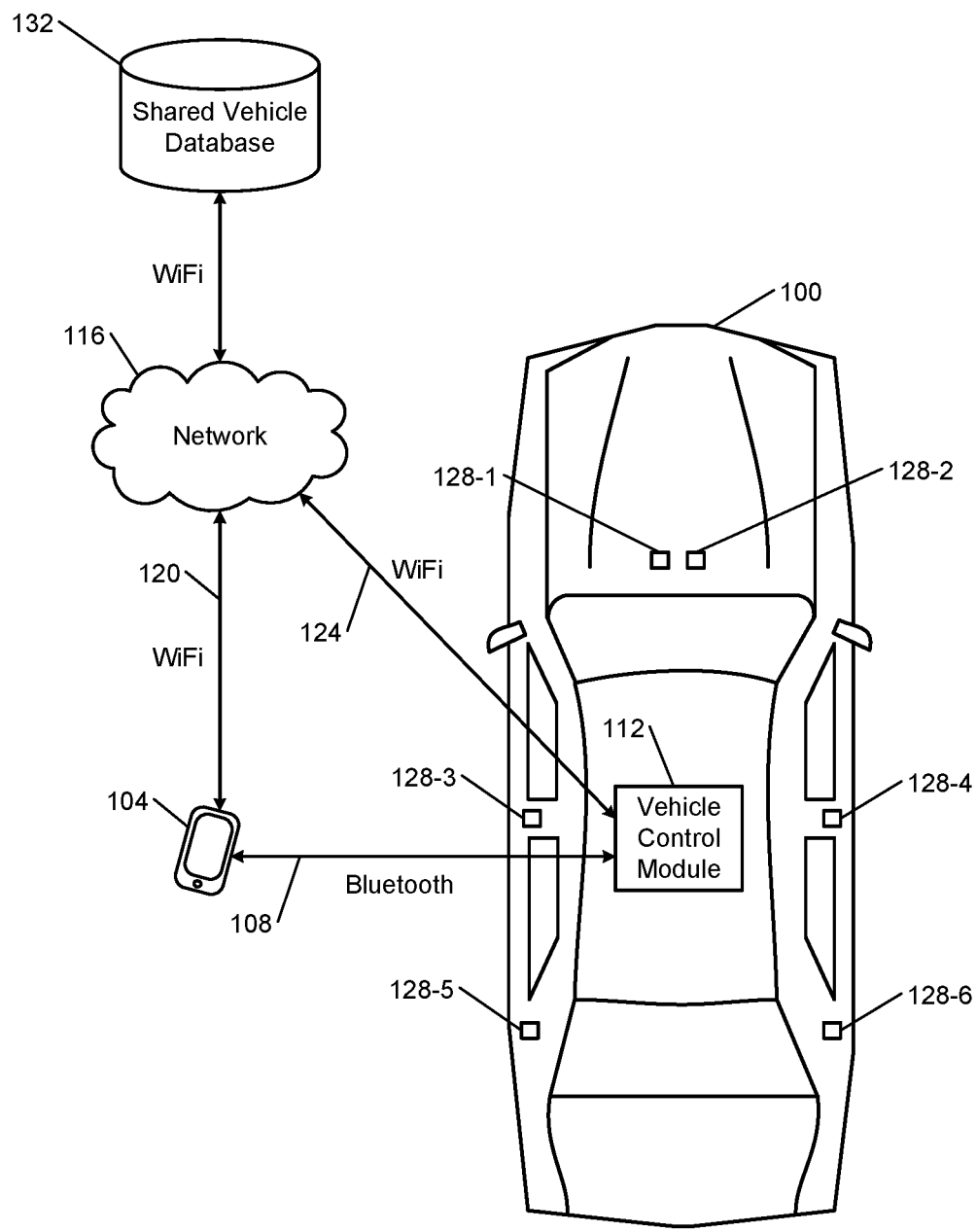
FIG. 1 illustrates an automatic pairing system in a vehicle according to the present disclosure.

Referring to FIG. 1, an automatic pairing system in a vehicle 100 according to the present disclosure is illustrated. A device 104 is connected via a Bluetooth connection 108 to a vehicle control module 112 of the vehicle 100. The device 104 may be any Bluetooth enabled communication device such as a smart phone, smart watch, wearable electronic device, key fob, tablet device, or other device associated with a user of the vehicle 100, such as an owner, driver, passenger of the vehicle 100, and/or a technician for the vehicle 100. As noted above, the Bluetooth connection 108 may be a Bluetooth Low Energy (BLE) connection. Alternatively, a Wi-Fi, Wi-Fi direct, UWB, and/or IR UWB connection may be used in place of the Bluetooth connection 108.

The device 104 and the vehicle 100 connect to a network 116 via a first WiFi connection 120 and a second WiFi connection 124, respectively. The vehicle 100 further includes a plurality of sensors 128-1, 128-2, 128-3, 128-4, 128-5, and 128-6, collectively referred to as 128. While FIG. 1 illustrates an automatic pairing system with six sensors 128-1-128-6, any number of sensors can be used. For example, the automatic pairing system can include seven, eight, nine, ten, eleven, twelve, or more sensors. In this way, while the present disclosure provides an example utilizing six sensors, additional or fewer sensors can be used in accordance with the present disclosure.

Each of the sensors 128 includes a Bluetooth low energy (BLE) chipset connected to an antenna. The antenna may be located internal to the sensors 128. Alternatively, the antenna may be located external to the sensors 128. The sensors 128 receive BLE signals using the antenna and, specifically, receive BLE physical layer messages using a BLE physical layer controller 600. The sensors 31 are capable of observing BLE physical layer messages and taking measurements of the physical properties of the associated signals, including, for example, the received signal strength and determine a received signal strength indication (RSSI) using a channel map that is produced by a channel map reconstruction module. Additionally or alternatively, the sensors 128 can determine other measurements of the physical properties of the associated signals, including, for example, data related to the angle of arrival. Additionally or alternatively, the sensors 128 can communicate with each other and/or communicate with the vehicle control module 112 via a vehicle interface to determine time difference of arrival, time of arrival, or angle of arrival data for signals received by multiple sensors. Additionally or alternatively, the sensors 128 can measure and determine round trip time of flight information about signals sent and received to and from the device 104. Based on the measured and determined information about the communication signals sent between the device 104 and the sensors 128, such as the RSSI, angle of arrival information, time difference of arrival, round trip time of flight information, etc., the vehicle control module 112 may determine a location of the device 104 relative to the vehicle 100 for purposes of determine whether to allow access to the vehicle 100, unlocking doors of the vehicle 100, opening a trunk of the vehicle 100, etc.

In some embodiments, the vehicle control module 112 will pair with the device 104 via the Bluetooth connection 108. For example, the device 104 and the vehicle control module 112 go through a pairing process to establish a trust relationship. The pairing process can include: Bluetooth pairing, as described by Bluetooth specification; pairing whereby additional security information is exchanged between the vehicle control module 112 and the device 104 using the device 104 and vehicle 100 interfaces; pairing whereby device addresses, device identity resolving keys, reservation IDs, and encryption keys are exchanged via a cloud infrastructure; and/or pairing whereby a certificate to use the vehicle is presented to the vehicle where the certificate is signed by the vehicle owner's device and or a trusted security signing authority such as the vehicle manufacturer or trusted third party. In the case of a certificate, the certificate can contain the restrictions in use cases (i.e., geo fencing, valet mode restrictions), validity period, whether reporting back to the owner about driving performance/behavior is required, etc.

As stated, the vehicle control module 112 will connect with the network 116 via the second WiFi connection 124. Further, the device 104 connects with the network 116 via the first WiFi connection 120. Both the device 104 and the vehicle control module 112 connect with the network 116 to exchange security information using the cloud infrastructure. As will be further described, security information for respective devices will be accessible in the network 116 for shared vehicles to establish an automated pairing process between previously paired devices and shared vehicles.

The network 116 also communicates with a shared vehicle database 132. The shared vehicle database 132 includes information regarding shared vehicles. Shared vehicles may be designated in a family network, in a rental company network, in a delivery company network, etc. The shared vehicle database 132 includes access permissions for specific devices. That is, each shared vehicle in the shared vehicle database 132 includes data indicating which devices are allowed to access the shared vehicle. In this way, an administrator of the shared vehicle database may grant or rescind access permissions for a particular shared vehicle. For example, the device 104 may download an application where the administrator may grant and/or rescind access to a particular vehicle.

For example, in the case of a rental company, an administrator may grant a specific device access to a particular shared vehicle for a certain time frame. The access may be set to expire after a certain time frame has expired or date has passed. The shared vehicle database 132 will indicate for the appropriate period that the specific device, indicated by a device address, is allowed to access the particular shared vehicle. In the case that the particular shared vehicle is the vehicle 100 and the specific device is the device 104, the vehicle control module 112 can access the shared vehicle databased 132 through the network 116 and allow the device 104 to access the vehicle 100 for the prescribed period.

Automatically pairing the device 104 and the vehicle 100 allows a user to operate a passive entry/passive start (PEPS)

system of the vehicle 100 as well as access all the benefits of Bluetooth pairing. For example, when the device 104 and vehicle 100 are paired via the Bluetooth connection 108, the user can operate hands free calling via the vehicle 100, access contacts on the device 104, and stream audio files from the device 104.

Figure 3:
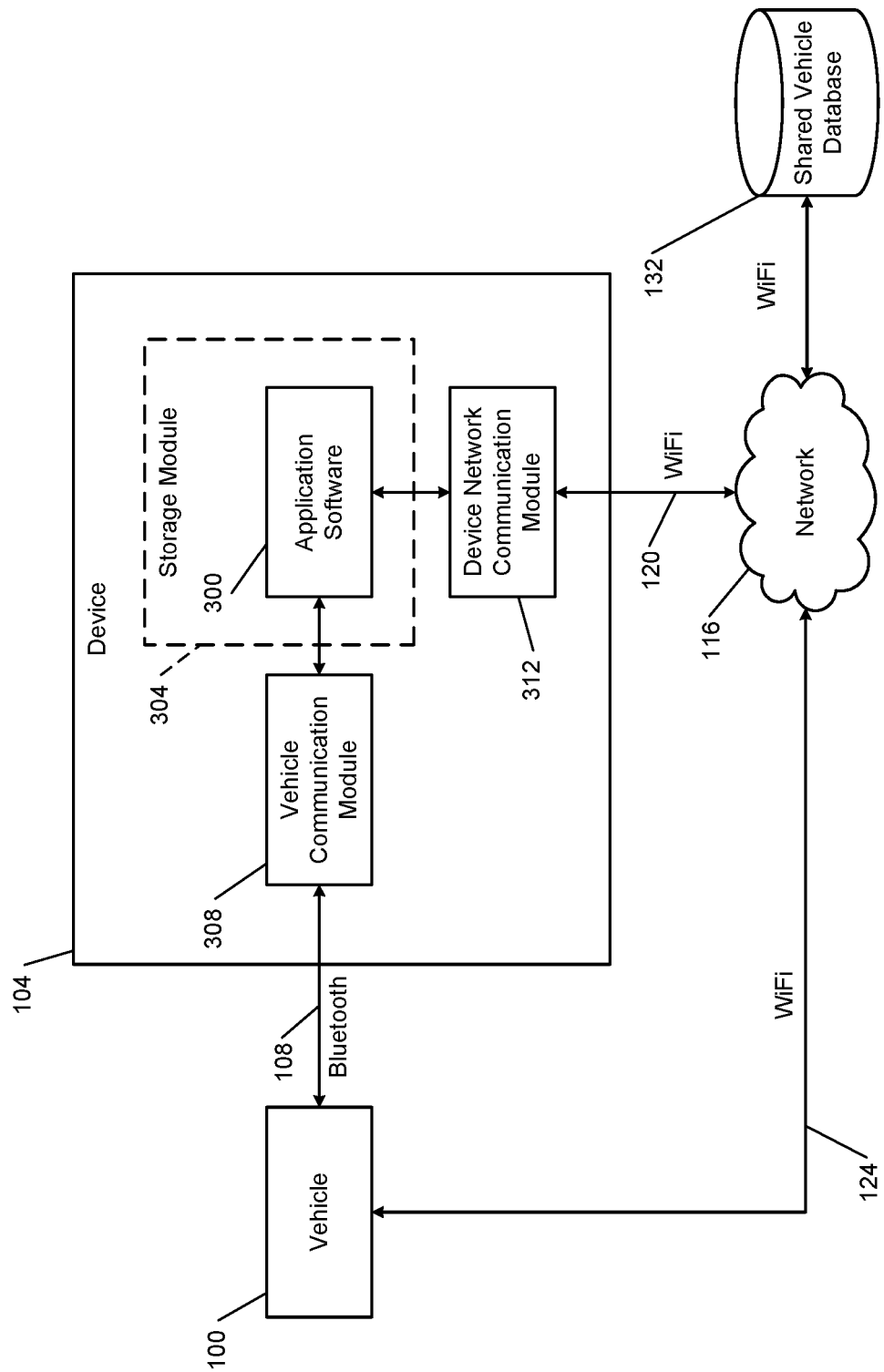
FIG. 3 illustrates a block diagram for a device of an automatic pairing system according to the present disclosure.

In one embodiment, to pair the device 104 and the vehicle 100, the device 104 will advertise BLE signals, for example, an advertisement message, via an antenna (included in a vehicle communication module of FIG. 3). Once the device 104 is within a predetermined range of the vehicle 100, antennas included in the sensors 128 of the vehicle 100 (as well as the antenna included in the vehicle control module 112) will receive the advertisement message and transmit a discovery message. The device 104 may receive the discovery message along with a request for device information, such as a device address. Alternatively, the vehicle 100 may receive device information in the advertisement message.

In response to receiving the device address, the vehicle control module 112 may authenticate the device 104 using a challenge-response scheme. The vehicle control module 112 can determine whether the device 104 has been granted access to the vehicle 100 based on data included in the shared vehicle database 132. Further, as will be discussed, if the device 104 has been previously paired with the vehicle 100 (and the pairing has not been intentionally disconnected), the vehicle control module 112 and the device 104 can use the same security information used to previously pair the device 104 and the vehicle 100. Additionally, once the device 104 has been paired with the vehicle 100 or any other vehicle included in the shared vehicle database 132, the vehicle control module 112 transmits the security information to the shared vehicle database 132 to store the security information for future use in pairing shared vehicles to the device 104.

The security information may include the PIN code, the link key, and/or the challenge used for the corresponding device address of the device 104 and the corresponding vehicle ID for the vehicle 100. In this way, the security information may be used by another vehicle in the shared vehicle database 132 to automatically pair with the device 104 without the need for the user to manually pair the device 104. That is, another vehicle will be able to mimic the vehicle 100 with which the device 104 was originally paired. Additional discussion regarding PEPS systems and Bluetooth pairing is included in U.S. patent application Ser. No. 15/730,265, filed on Oct. 11, 2017, which is incorporated herein by reference.

Figure 2:
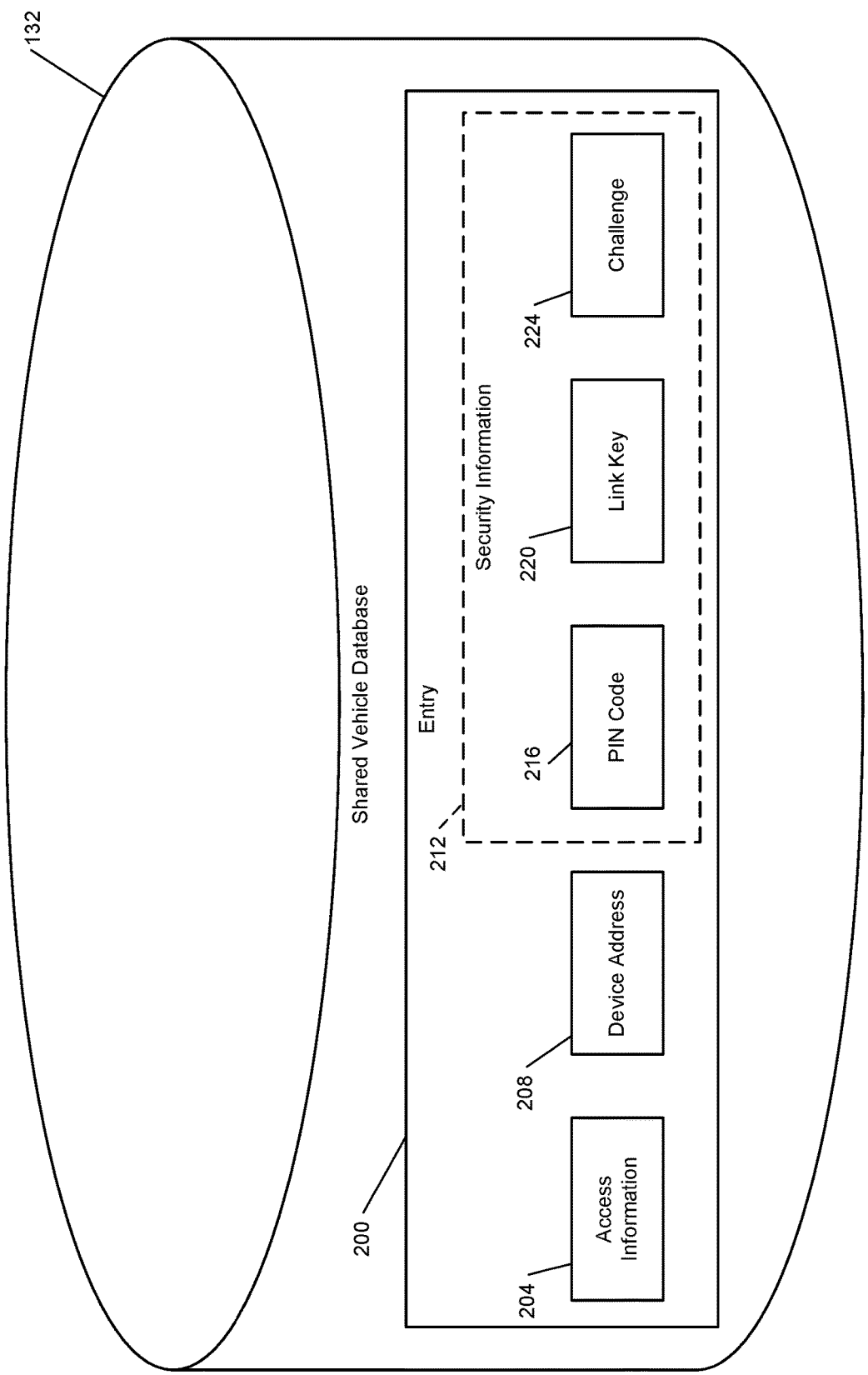
FIG. 2 illustrates an entry included in a shared vehicle database according to the present disclosure.

Referring to FIG. 2, an entry 200 included in the shared vehicle database 132 according to the present disclosure is illustrated. Each entry 200 of the shared vehicle database 132 corresponds to a vehicle ID for the respective shared vehicle. Further, each entry 200 includes access information 204, a device address 208, and security information 212. The security information 212 may optionally include a PIN code 216, a link key 220, and a challenge 224. The access information 204 indicates whether the device address 208 is presently granted access to the vehicle that corresponds to the entry 200, for example, the vehicle 100 of FIG. 1. As discussed, the access information 204 may be adjusted through the application as further illustrated by application software 300 of FIG. 4. The PIN code 216, the link key 220, and the challenge 224 are stored as a result of a previous pairing between the device corresponding to the device address 208, for example, the device 104 of FIG. 1, and any vehicle included in the shared vehicle database, for example, any vehicle that corresponds to one of the entries in the shared vehicle database 132.

The vehicle control module 112 of FIG. 1 may access the shared vehicle database 132 and determine whether to instruct an authentication module (included in FIG. 5) to authenticate the device 104 using the security information 212 in the entry 200 of the shared vehicle database 132 that corresponds to the respective vehicle that the device 104 is attempting to pair with. The device 104 of FIG. 1 may update the shared vehicle database 132 based on access permissions received through the application on the device 104 or any other device that has downloaded the application. The application can further update entries in the shared vehicle database 132 when the device 104 is first paired to a vehicle corresponding to the entry 200 of the shared vehicle database 132. That is, the application (and the vehicle control module 112) can update access permissions for the device 104 as well as security information 212 generated during a manual pairing event. Moreover, the administrator may create a new entry through the application for a new vehicle that is to be added to the shared vehicle database 132.

Referring to FIG. 3, a block diagram for the device 104 of an automatic pairing system according to the present disclosure is illustrated. The device 104 may include application software 300 within a storage module 304, a vehicle communication module 308, and a device network communication module 312.

The vehicle communication module 308 can include a BLE chipset connected to an antenna. The storage module 304 may be a computer-readable storage module or device. The device 104 can also optionally include a GPS module or other device location service. The vehicle communication module 308 allows for the vehicle control module 112 of the vehicle 100 to communicate with application software 300 of the device 104.

In the case that a user desires to pair the device 104 with the vehicle 100 and the device 104 has never been paired with the vehicle 100 or any other shared vehicle in the shared vehicle database 132, the user will be instructed to manually pair the vehicle 100 and the device 104. Once the device 104 is manually paired to the vehicle 100, the device 104 and the vehicle 100 may store locally the security information 212 used to pair the two devices, which automates the pairing in the future. Further, if the vehicle 100 is listed as a vehicle in the shared vehicle database 132, the application software 300 on the device 104 may save the corresponding security information 212 in the shared vehicle database 132. For example, if the device 104 is paired to one of the vehicles based on the PIN code 216, the link key 220, and the challenge 224 may be included in the entry 200 (as shown in FIG. 2) of the shared vehicle database 132 corresponding to a vehicle ID. The entry 200 also includes the respective device address. In this way, when the device 104 is attempting to pair with a second vehicle included in the shared vehicle database 132 and the shared vehicle database indicates the device 104 has been granted access to the second vehicle, the application software 300 can direct the vehicle 100 (more specifically, the vehicle control module 112) to use the security information 212 included in the shared vehicle database 132 to pair the second vehicle and the device 104.

In the case that the device 104 has previously been manually paired with the vehicle 100, the device 104 will automatically pair. As described above, once the device 104 is within the predetermined range of the vehicle 100, the device 104 automatically pairs with the vehicle 100 in response to the advertisement message transmitted by the device 104. Once initially connected, the vehicle control module 112 determines if the device 104 has been granted access to the vehicle 100 according to the shared vehicle database 132. Then, the vehicle 100 and the device 104 access locally stored security information 212 to pair the vehicle 100 and device 104. The security information 212 will be stored locally on the vehicle 100 and the device 104 if the device 104 was previously manually paired with the vehicle 100.

Alternatively, if the device 104 has not been manually paired with the vehicle 100 but the device 104 has been paired with at least one of the vehicles included in the shared vehicle database 132, the vehicle 100 and the device 104 may access the security information 212 in the shared vehicle database 132 to pair the two devices, as described above. That is, when the vehicle 100 matches the entry 200 including the device address 208 of the device 104, the necessary access permissions according to the access information 204, and security information 212 (indicating the device 104 has been previously paired with a vehicle in the shared vehicle database 132) in the shared vehicle database 132, an authentication module (shown in FIG. 5) may pair the device 104 and the vehicle 100 based on the stored security information 212.

Figure 4:
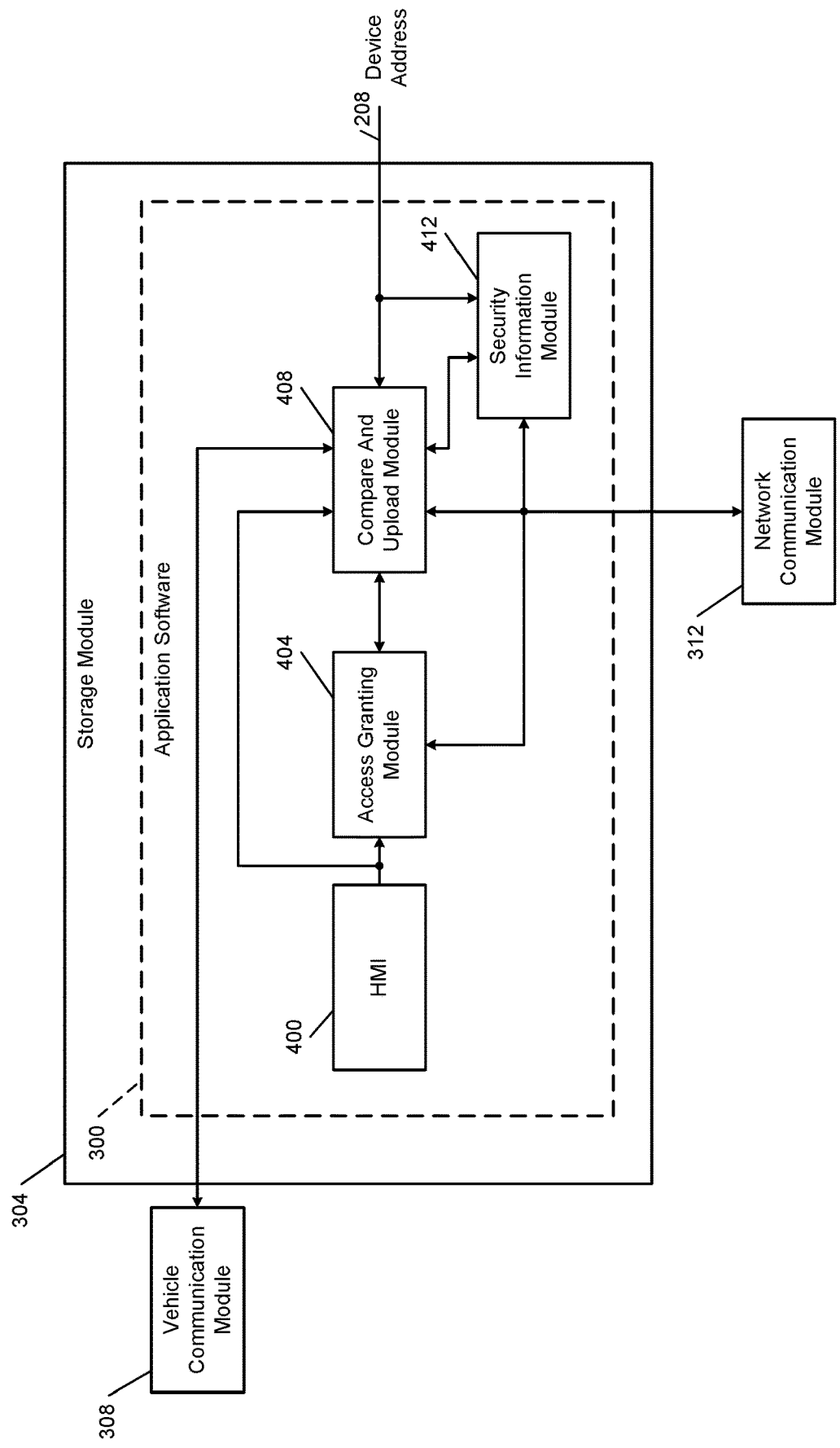
FIG. 4 illustrates a block diagram of application software on a device of an automatic pairing system according to the present disclosure.

Referring to FIG. 4, a block diagram of application software 300 on the device 104 of an automatic pairing system according to the present disclosure is illustrated. The application software 300 may include a human machine interface (HMI) 400, an access granting module 404, a compare and upload module 408, and a security information module 412. The HMI 400 may be a display on the device 104 where the user can input information, for example, the HMI 400 may be a touchscreen, push buttons, or another system for the user to input information through the device 104.

The access granting module 404 determines whether the device 104 has been granted access to the vehicle 100 according to the shared vehicle database 132. For example, the application software 300 may be used to control access to the vehicles included in the shared vehicle database 132 as well as manage which vehicles are included. Specifically, the administrator may add or delete vehicles to the shared vehicle database 132 through the application software 300 using the HMI 400. The application software 300 may include an administrator portion where an administrator can delegate access to vehicles. The application software 300 may require an authentication code to allow managing access to the shared vehicle database 132. For example, the access granting module 404 may retrieve the current access (for example, granted, rescinded, or never granted) according to the shared vehicle database 132 (through the device network communication module 312). Then, the administrator, or any individual with the requisite authentication code, may select the specific vehicle through the HMI 400, see the current access, and alter the current access for the specific vehicle. Alternatively, the administrator may not alter the current access for the specific vehicle.

The compare and upload module 408 uploads changes to the current access for the vehicle 100 through the HMI 400 and uploads security information 212 used for pairing between a new device and one of the vehicles in the shared vehicle database 132. The pairing of the new device and the vehicle 100 occurs via the vehicle communication module 308.

As described above, to pair a new device with the vehicle 100 using a Bluetooth connection may require the transfer of security information 212 such as the PIN code 216, the link key 220, the challenge 224 as well as the device address 208 and vehicle ID information. To mimic the pairing on a different vehicle, the compare and upload module 408 saves all the security information 212 to the shared vehicle database 132 via the device network communication module 312 and the network 116. Then, when the new device encounters a different vehicle included in the shared vehicle database 132 and has been granted access to the different vehicle, the security information module 412 and the vehicle control module 112 may retrieve the saved security information 212 to create a mimicked trusted connection with the new device, offering all the benefits and functionality of Bluetooth pairing through the different vehicle without requiring the user to manually pair the new device.

The security information module 412 locally stores security information 212 when the device 104 is paired with a particular vehicle. To pair with any vehicle, the security information module 412 transmits the relevant security information 212, either stored locally or retrieved from the shared vehicle database 132.

Figure 5:
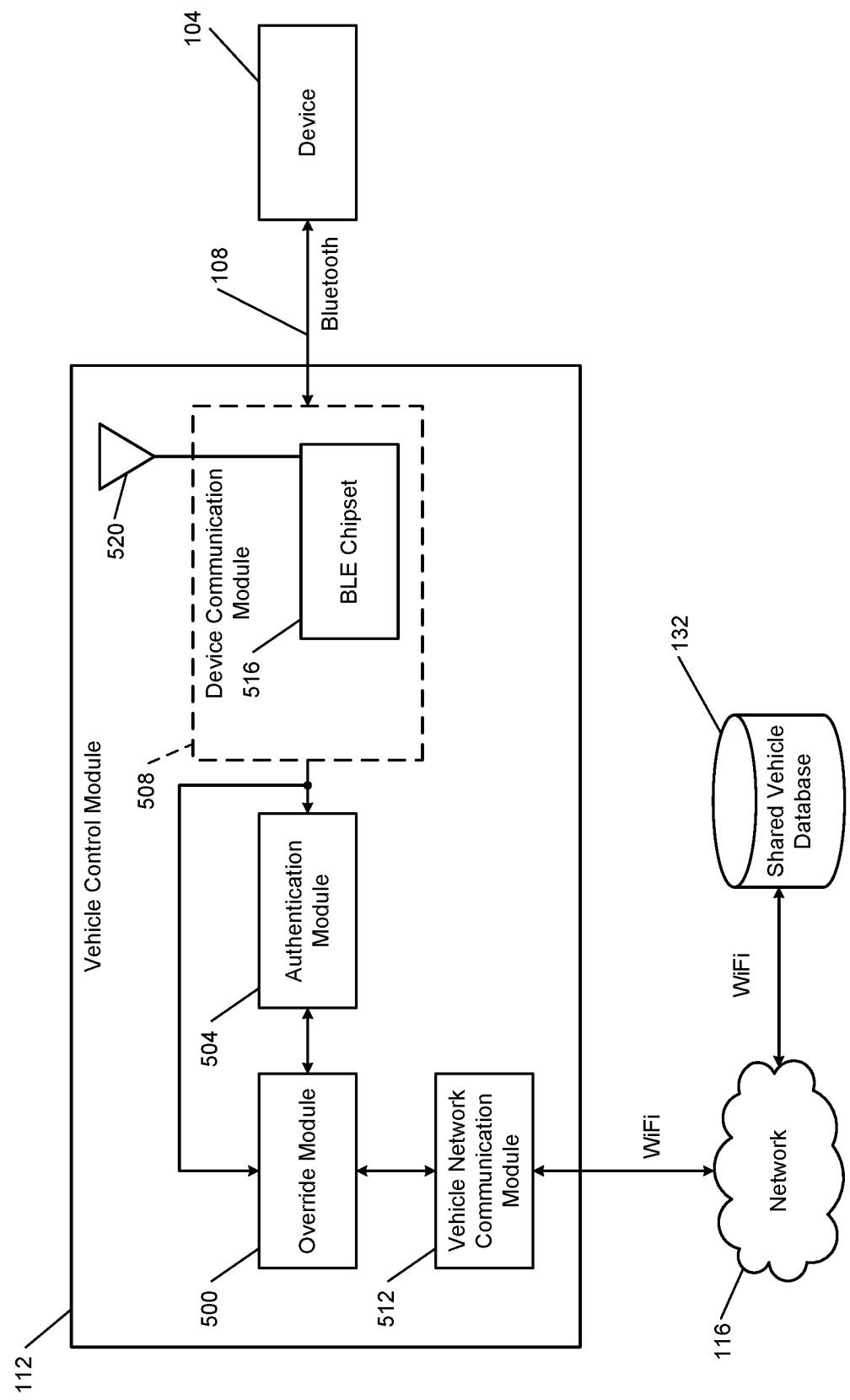
FIG. 5 illustrates a block diagram for a vehicle control module of an automatic pairing system according to the present disclosure.

Referring to FIG. 5, a block diagram for the vehicle control module 112 of an automatic pairing system according to the present disclosure is illustrated. The vehicle control module 112 may include an override module 500, an authentication module 504, a device communication module 508, and a vehicle network communication module 512. The device communication module 508 includes a Bluetooth chipset 516 and an antenna 520. The device communication module 508 connects with the device 104 via the Bluetooth connection 108.

The override module 500 receives the device address from the device 104 and determines if the device 104 has previously paired with the vehicle 100. If the device 104 has previously paired with the vehicle 100, the authentication module 504 uses locally stored security information 212 as long as the shared vehicle database 132 indicates the device 104 has been granted access to the vehicle 100. Alternatively, the security information 212 may also be accessed from the shared vehicle database 132, which the authentication module 504 could also use to pair the two devices.

If the vehicle 100 has not been previously paired to the device 104, the override module 500 identifies the relevant entry 200 of the shared vehicle database 132 (that is, the vehicle ID corresponding to the entry 200) and determines whether the device address 208 has access to the vehicle 100. Further, the override module 500 identifies any security information 212 saved in the entry 200. If the appropriate security information 212 has been uploaded to the shared vehicle database 132, the override module 500 instructs the authentication module 504 to use the saved security information 212 to pair with the device 104. That is, instead of manually pairing the device 104, the authentication module 504 is instructed to use the stored PIN code 216, link key 220, and/or challenge 224 to authenticate the device 104. In another embodiment, the stored security information 212 may include a previously paired indicator, instructing the authentication module 504 to bypass authentication and pair the device 104 with the vehicle 100.

In some embodiments, the authentication module 504 stores security information 212 when the device 104 is manually paired with the vehicle 100. Having the security information 212 stored locally on the authentication module 504 allows the device 104 to easily pair with the vehicle 100 in the future and prevents the need for any manual pairing or access to the shared vehicle database 132. Alternatively, the security information 212 may always be stored in the shared vehicle database 132. That is, the shared vehicle database 132 may always be used to pair the device 104 with the vehicle 100 as long as the device 104 has been previously paired with at least one vehicle in the shared vehicle database 132.

Figure 6:
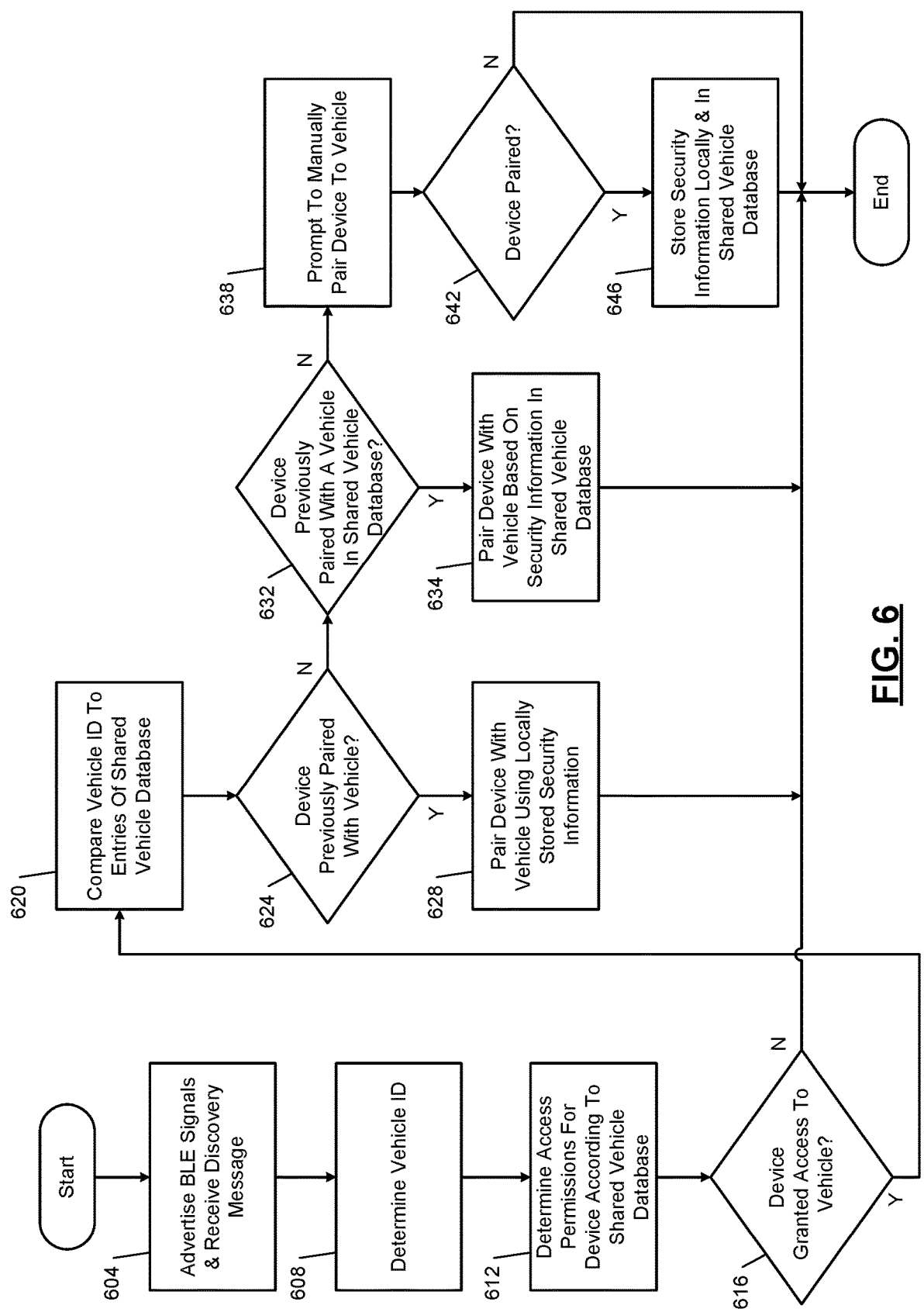
FIG. 6 illustrates a flow diagram for a device of an automatic pairing system according to the present disclosure.

Referring to FIG. 6, a flow diagram for the device 104 of an automatic pairing system according to the present disclosure is illustrated. Control begins at 604 where the device 104 advertises BLE signals. If the device 104 is within the predetermined range of a Bluetooth enabled vehicle, for example, the vehicle 100, the device 104 may receive a discovery message from the vehicle 100. Control continues to 608 where the vehicle ID is determined. The vehicle ID may be included in the discovery message or separately requested and received at the device 104. After determining the vehicle ID, control continues to 612 to determine access permissions of the device 104 to the vehicle 100 according to the shared vehicle database 132. That is, as described previously, the access granting module 404 determines, based on the entry 200 corresponding to the vehicle ID in the shared vehicle database 132, whether the device 104 has been granted access to the vehicle 100.

At 616, if the device has been granted access to the vehicle 100, control continues to 620, otherwise, control ends. Optionally, via the HMI 400 and the application software 300, the user may grant the device 104 access if they have the required access code. That is, instead of control ending, the device 104 could prompt the user to enter the required access code to gain access to the vehicle 100. Then, if the user entered the correct authentication code, control could continue to determine whether the shared vehicle database 132 includes sufficient security information 212 to pair the device 104 with the vehicle 100.

At 620, once control has determined that the device 104 has been granted access to the vehicle 100, the compare and upload module 408 compares the vehicle ID of the vehicle 100 with the entries included in the shared vehicle database 132. At 624, the compare and upload module 408 determines if the device 104 has been previously paired with the vehicle 100. If the device 104 has previously paired with the vehicle 100, the compare and upload module 408 instructs the security information module 412 to use locally stored security information 212 to pair with the vehicle 100 at 628 and control ends.

If the device 104 has not previously paired with the vehicle 100 at 624, control continues to 632 where the compare and upload module 408 determines whether the device 104 was previously paired with a vehicle included in the shared vehicle database 132. If the device 104 has been previously paired with a vehicle in the shared vehicle database 132, control continues to 634. At 634, the compare and upload module 408 transmits an indication to the security information module 412 to access the shared vehicle database 132 and use the security information 212 corresponding to the vehicle ID and device address to pair the device 104 with the vehicle 100. After the security information module 412 is instructed to use the appropriate security information 212, control ends.

If the device 104 has never been paired with any vehicle included in the shared vehicle database 132 at 632, control continues to 638 to prompt, via the HMI 400, the user to manually pair the device 104 with the vehicle 100. Once the device is paired at 642, the security information module 412 stores the security information 212 locally and the security information 212 is stored in the shared vehicle database 132 with the respective device address of the device 104 through the compare and upload module 408 at 646. After the security information 212 is stored at 646 or if the device 104 fails to pair at 642, control ends.

Figure 7:
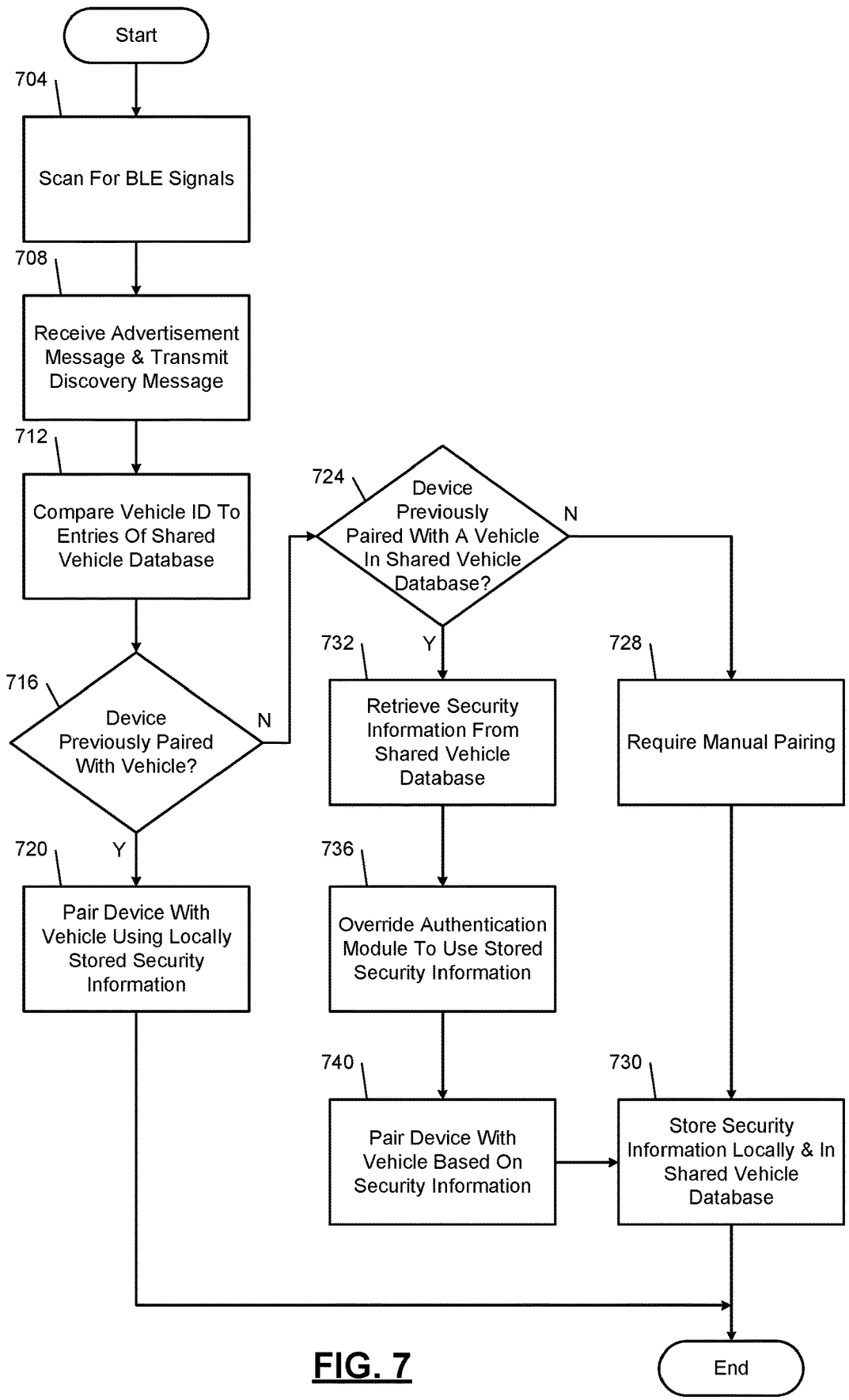
FIG. 7 illustrates a flow diagram for a vehicle control module of an automatic pairing system according to the present disclosure.

Referring to FIG. 7, a flow diagram for the vehicle control module 112 of an automatic pairing system according to the present disclosure is illustrated. Control begins at 704 where the antenna 520 and/or the sensors 128 scan for BLE signals. At 708, once the antenna 520 and/or sensors 128 receive the advertisement message from the device 104, the device communication module 508 transmits the discovery message. Control continues to 712 where the override module 500 compares the vehicle ID to the entries of the shared vehicle database 132. The override module 500 determines if the device 104 has previously paired with the vehicle 100 at 716. That is, if there is the entry 200 corresponding to the vehicle ID including the device address 208, the vehicle 100 has previously paired with the device 104. Alternatively, the override module 500 may determine whether the vehicle 100 has previously paired with the device 104 based on locally stored security information 212 included in the authentication module 504. That is, if the vehicle 100 had previously been paired with the device 104 the authentication module 504 would store the security information 212 to pair the vehicle 100 with the device 104 in the future.

At 716, if the device 104 was previously paired with the vehicle 100, control continues to 720 to use the locally stored security information 212 to pair the device 104 with the vehicle 100. That is, the security information 212 stored in the authentication module 504 is used to pair the device 104 with the vehicle 100. After the device 104 is paired, control ends.

If it is determined at 716 that the device 104 has not been previously paired with the vehicle 100, control continues to 724 where the override module 500 determines if the device 104 has previously paired with a vehicle included in the shared vehicle database 132. If the device 104 has never paired with any vehicle in the shared vehicle database 132, control continues to 728 where the authentication module 504 requires a manual pairing of the device 104 with the vehicle. Control continues to 730 where the override module 500 instructs the authentication module 504 to store the respective security information 212 locally and transmits the respective security information 212 to the shared vehicle database 132 to include in the corresponding entry 200. Then, control ends.

If 724 is true, control continues to 732 where the override module 500 retrieves security information 212 from the shared vehicle database 132. At 736, the override module 500 overrides the authentication module 504, instructing the authentication module 504 to use the security information 212 stored in the shared vehicle database 132. Control continues to 740 where the device 104 is paired with the vehicle 100 based on the security information 212 in the shared vehicle database 132. Control continues to 730 to store the respective security information 212 locally and in the shared vehicle database 132. Then, control ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A method for pairing a device with a vehicle of a plurality of shared vehicles comprising:
   receiving an advertisement message from the device; and
   in response to receiving the advertisement message, initiating an attempt to pair with the device including:
      determining if the device has previously paired with at least one vehicle of the plurality of shared vehicles; and
      in response to the device having previously paired with the at least one vehicle of the plurality of shared vehicles:
         accessing a shared vehicle database;
         identifying security information corresponding to (i) a device address of the device and (ii) a vehicle ID of the vehicle; and
         instructing the vehicle and the device to use the identified security information to pair the device with the vehicle;
   wherein:
      the shared vehicle database includes a plurality of entries and each entry corresponds to a different vehicle indicated by the vehicle ID of the different vehicle; and
      each entry of the shared vehicle database includes: (i) access information, (ii) the device address, and (iii) security information.

2. The method of claim 1 further comprising, in response to the device having previously paired with the vehicle:
   accessing a local storage of a vehicle control module to retrieve security information; and
   initiating the attempt to pair the device with the vehicle based on the security information.

3. The method of claim 2 wherein the local storage of the vehicle control module is stored in an authentication module.

4. The method of claim 1 wherein the security information includes: (i) a PIN code, (ii) a link key, and (iii) a challenge.

5. The method of claim 1 wherein the access information indicates whether the device address has been granted access to the vehicle ID that corresponds to the entry.

6. The method of claim 5 wherein an application accessible via the device updates and alters the access information for each entry in response to an administrator entering a correct access code to the application.

7. The method of claim 6 wherein the application includes a human machine interface (HMI), wherein the HMI is a touchscreen configured to display user-selectable information to the administrator.

8. The method of claim 1 further comprising, in response to the device having not previously paired with at least one vehicle of the plurality of shared vehicles, requesting a manual pairing including:
   sending, via an authentication module, a PIN code to the device;
   generating, via the authentication module, a link key based on the PIN code;
   in response to receiving the device address of the device, transmitting, via the authentication module, a challenge to the device;
   determining based on at least one of: (i) the link key, (ii) the device address, and (iii) the challenge whether to the device is a trusted device;
   in response to determining the device is the trusted device, pairing the device and the vehicle; and
   storing, in the authentication module and in the shared vehicle database, (i) the PIN code, (ii) the link key, (iii) the device address, and (iv) the challenge as security information.

9. A vehicle control system of a vehicle for pairing a device with the vehicle of a plurality of shared vehicles comprising:
   a device communication module configured to receive an advertisement message from the device; and
   in response to receiving the advertisement message, a vehicle control module initiates an attempt to pair the vehicle with the device including:
      an override module configured to determine if the device has previously paired with at least one vehicle of the plurality of shared vehicles; and
      in response to the device having previously paired with the at least one vehicle of the plurality of shared vehicles:
         accessing, via a vehicle network communication module, a shared vehicle database, wherein the shared vehicle database includes security information for each vehicle of the plurality of shared vehicles;
         identifying, via an authentication module, security information corresponding to (i) a device address of the device and (ii) a vehicle ID of the vehicle; and
         instructing, via the override module and the authentication module, the vehicle and the device to use the identified security information to pair the device with the vehicle;
   wherein:
      the shared vehicle database includes a plurality of entries and each entry corresponds to a different vehicle indicated by the vehicle ID of the different vehicle; and
      each entry of the shared vehicle database includes: (i) access information, (ii) the device address, and (iii) security information.

10. The system of claim 9 further comprising, in response to the device having previously paired with the vehicle:
   accesses a local storage of the vehicle control module to retrieve security information; and
   initiates the attempt to pair the device with the vehicle based on the security information.

11. The system of claim 10 wherein the local storage of the vehicle control module is stored in the authentication module.

12. The system of claim 9 wherein the security information includes: (i) a PIN code, (ii) a link key, and (iii) a challenge.

13. The system of claim 9 wherein the access information indicates whether the device address has been granted access to the vehicle ID that corresponds to the entry.

14. The system of claim 13 wherein an application accessible via the device updates and alters the access information for each entry in response to an administrator entering a correct access code to the application.

15. The system of claim 14 wherein the application includes a human machine interface (HMI), wherein the HMI is a touchscreen configured to display user-selectable information to the administrator.

16. The system of claim 9 further comprising, in response to the device having not previously paired with at least one vehicle of the plurality of shared vehicles, the authentication module requests a manual pairing including:
   sending, via the authentication module, a PIN code to the device;
   generating, via the authentication module, a link key based on the PIN code;
   in response to receiving the device address of the device, transmitting, via the authentication module, a challenge to the device;
   determining based on at least one of: (i) the link key, (ii) the device address, and (iii) the challenge whether to the device is a trusted device;
   in response to determining the device is the trusted device, pairing the device and the vehicle; and
   storing, in the authentication module and in the shared vehicle database, (i) the PIN code, (ii) the link key, (iii) the device address, and (iv) the challenge as security information.

17. A method for pairing a device with a vehicle of a plurality of shared vehicles comprising:
   receiving an advertisement message from the device; and
   in response to receiving the advertisement message, initiating an attempt to pair with the device including:
      determining if the device has previously paired with at least one vehicle of the plurality of shared vehicles;
      in response to the device having previously paired with the at least one vehicle of the plurality of shared vehicles:
         accessing a shared vehicle database;
         identifying security information corresponding to (i) a device address of the device and (ii) a vehicle ID of the vehicle; and
         instructing the vehicle and the device to use the identified security information to pair the device with the vehicle; and
      in response to the device having not previously paired with at least one vehicle of the plurality of shared vehicles, requesting a manual pairing including:
         sending, via an authentication module, a PIN code to the device;
         generating, via the authentication module, a link key based on the PIN code;
         in response to receiving the device address of the device, transmitting, via the authentication module, a challenge to the device;
         determining based on at least one of: (i) the link key, (ii) the device address, and (iii) the challenge whether to the device is a trusted device;
         in response to determining the device is the trusted device, pairing the device and the vehicle; and
         storing, in the authentication module and in the shared vehicle database, (i) the PIN code, (ii) the link key, (iii) the device address, and (iv) the challenge as security information.

* * * * *